United States Patent Office 2,921,855
Patented Jan. 19, 1960

2,921,855
A HIGHLY NUTRITIONAL MARGARINE

Daniel Melnick, Teaneck, and Chester M. Gooding, Westfield, N.J., assignors to Corn Products Company, a corporation of Delaware No Drawing. Application June 19, 1957
Serial No. 666,762

6 Claims. (Cl. 99—122)

This invention relates to a novel margarine the fat of which is characterized by having a high essential fatty acid content and, more particularly, it pertains to a highly nutritious margarine the fat of which having high essential fatty acid content and relatively low trans fatty acid content and to the method of preparing the same.

Hydrogenated fats previously known have been subject to frequent criticism in both the scientific and lay press, since there is a decrease in essential fatty acid content and a development of isomers of fatty acids, e.g. trans oleic acid, as a result of hydrogenation of oil.

That the essential fatty acids found in limpid vegetable oils are important nutrients is well established by the large number of publications on this subject. The term "essential" means that these fatty acids, linoleic and linolenic acid, cannot be produced within the body but must be furnished preformed in the diet fed to the animal organism. Whereas the active metabolic form of the essential fatty acids in the animal body is arachidonic acid, linoleic and linolenic acid are convertible to arachidonic acid in vivo, the transformation being expedited by vitamin $B_6$. Thus, any one of the three fatty acids mentioned can serve as a source of the essential fatty acids. From the practical standpoint, however, the only abundant and dependable dietary source is linoleic acid, found in rich supply in the limpid unhydrogenated domestic vegetable oils. This is illustrated by the following Table 1.

The essential fatty acids have been shown to be required as dietary components for every animal species studied. Not only are they required for proper growth, reproduction, lactation and longevity and for normal tissue structure, but also for control of normal plasma and liver cholesterol levels and of normal liver lipid levels.

In hydrogenating an oil for margarine production under selective conditions, there is a minimal increase in the concentration of the saturated fatty acids. There occurs preferential hydrogenation of the polyunsaturated fatty acids to oleic acid, in the course of which trans-isomers are produced.

In the production of oils for shortening manufacture there is some increase in the concentration of the saturated fatty acids. The oils for shortening manufacture are hydrogenated to a greater degree under non-selective conditions. The latter conditions permit some conversion of oleic to stearic acid so that the total saturated fatty acid content tends to be about 10 to 15 percent greater than that of the starting oil. For a given iodine value decrease on hydrogenation under selective conditions, there tends to be a greater development of trans-acids.

The changes which occur in oils on hydrogenation for margarine or shortening manufacture are illustrated by the data in the following two tables. Table 2 presents the average fatty composition of margarine type fats from 1932 until the present day.

TABLE 1
Typical essential fatty acid contents of oils and fats

| Oil or Fat | Source | Linoleic Acid, percent | Linolenic Acid, percent | Arachidonic Acid, percent |
|---|---|---|---|---|
| Peanut | Domestic—vegetable. | 25 | 0 | 0 |
| Sesame | do | 42 | 0 | 0 |
| Cottonseed | do | 50 | 0 | 0 |
| Corn | do | 52 | 0 | 0 |
| Sunflower | do | 59 | 0 | 0 |
| Soybean oil | do | 51 | 7 | 0 |
| Safflower | do | 70 | 0.5 | 0 |
| Coconut | Foreign—vegetable. | 2 | 0 | 0 |
| Olive | do | 7 | 0 | 0 |
| Tallow (beef) | Animal | 2 | 0.5 | 0.1 |
| Butter | do | 2 | 1 | 0.2 |
| Lard | do | 6 | 1 | 1 |

TABLE 2
Average fatty acid compositions of margarine fats in relation to other oils

| Fat | Iodine No. | Fatty Acid Composition [2] | | | | Characterization of Unsaturates | |
|---|---|---|---|---|---|---|---|
| | | Saturated, percent | Oleic, percent | Linoleic, percent | Linolenic, percent | Essential,[3] percent | Trans,[4] percent |
| Margarine Fats [1]: | | | | | | | |
| A. Former coconut oil type | 20.0 | 75.0 | 18.6 | 2.0 | 0.0 | 2.0 (max.) | 2.0 (max.) |
| B. Straight hydrogenated domestic oil type | 73.0 | 19.4 | 71.3 | 4.9 | 0.0 | 3.7 | 35.3 |
| C. As B, but of the plastic type | 80.0 | 16.4 | 69.5 | 9.7 | 0.0 | 6.9 | 35.0 |
| Oils before hydrogenation: | | | | | | | |
| D. Cottonseed oil | 109.0 | 24.5 | 21.6 | 49.5 | 0.0 | 48.0 | 2.3 |
| E. Soybean oil | 135.0 | 11.7 | 26.2 | 50.7 | 7.2 | 59.1 | 2.6 |
| F. 50:50 blend of D+E | 122.0 | 18.0 | 23.9 | 50.1 | 3.6 | 53.6 | 2.5 |
| Reference Fat: | | | | | | | |
| G. Butter | 41.0 | 54.9 | 37.2 | 2.3 | [5] 1.2 | 3.0 | 5.0–9.0 |

[1] Composition of the margarine fats:
A. A blend of 78% of coconut oil, 9% oleo oil, 7% lard and 6% hydrogenated cottonseed oil; this blend simulates the earlier composition of margarine fat at about 1932.
B. 50:50 blend of cottonseed-soybean oils selectively hydrogenated directly to the constants characteristic of whole margarine fats.
C. 50:50 blend of cottonseed-soybean oils selectively hydrogenated, one portion to a degree in excess of that characteristic of whole margarine fats, and the other portion to a compensating lesser degree.
[2] According to the spectrophotometric method (Official and Tentative Methods of the American Oil Chemists Society, Polyunsaturated Acids, Cd 7-48, revised May, 1953) following alkali isomerization to convert the polyunsaturated fatty acids to their light-absorbing conjugated forms.
[3] Based upon biological assay and expressed as linoleic acid equivalent (Deuel and associates, J. Nutrition 45:535, 1951).
[4] According to infrared absorption (Swern and associates, JAOCS, 27:17, 1950).
[5] Of this value, 0.2% is arachidonic acid (absolute basis).

It will be noted that with advances in the field of food technology, the change in margarine fat from the coconut-oil to the domestic-oil type has been associated with a marked increase in both the essential fatty acid and in the trans fatty acid contents. In recent years the essential fatty acid content has been increased even more according to both spectrophotometric and biological assay. Compare values for oil C with those for oil B in Table 2. Nevertheless, the hydrogenated margarine oils are still characterized by their low essential fatty acid content—very much less than that of the original unhydrogenated oils. However, butter too has a very low concentration of the essential fatty acids. There is no bread spread available today, of butter-like consistency and eating quality, comparable to the limpid unhydrogenated domestic vegetable oils as a source of the essential fatty acids.

In the case of shortenings, the fatty acid picture is as shown in Table 3. The products listed represent a variety of shortenings. Thus, product A is one which has been hydrogenated under non-selective conditions to an iodine value of about 74 and then supplemented with a completely hydrogenated vegetable fat, melting point of the latter being about 140° F. The same is true for shortening C. The two frying shortenings, identified as products B and E, have been hydrogenated directly to the iodine values indicated under more selective conditions. Shortening D is a product hydrogenated under non-selective conditions but without supplementation with the very high melting component employed in the manufacture of shortenings A and C.

TABLE 3

*Average fatty acid composition of hydrogenated shortening fats*

| Base Oil | Shortening | Iodine No. | Fatty Acid Composition | | | | Characteristics of Unsaturates | |
|---|---|---|---|---|---|---|---|---|
| | | | Saturated, percent | Oleic, percent | Linoleic, percent | Linolenic, percent | Essential, percent | Trans, percent |
| A. Soybean | All-purpose | 69.5 | 28.5 | 57.9 | 9.2 | 0.0 | 4.5 | 27.2 |
| B. Soybean | Frying | 67.2 | 20.8 | 74.8 | 0.0 | 0.0 | 0.0 | 32.0 |
| C. Soybean | Emulsified | 75.5 | 24.5 | 64.0 | 7.1 | 0.0 | 3.8 | 28.8 |
| D. Cottonseed | All-purpose | 59.4 | 36.3 | 52.5 | 6.8 | 0.0 | 10.2 | 23.5 |
| E. Cottonseed | Frying | 60.6 | 30.4 | 63.1 | 2.1 | 0.0 | 1.0 | 26.2 |

It will be noted that the shortenings like the margarine fats all contain a very low concentration of linoleic acid relative to that of the original oils (see Table 2) and that all the linolenic acid in the starting soybean oil is hydrogenated in the process. Essential fatty acid content, expressed as biologically active linoleic acid, is also greatly reduced and the trans fatty acid content is greatly increased. The small trans acid content of the original unhydrogenated oils (see Table 2) may be a reflection of the non-specificity of the analytical test; the small amount of infra-red absorption in the critical region of the spectrum attributed to trans acid content may be due to irrelevant absorption.

In Table 4 are listed the analytical constants obtained in testing the margarine and shortening fats as currently produced in the art. Melting point has been determined by the Wiley method, and iodine value according to the Wijs method. Of particular value are the figures for the solids content index (SCI) of each of the fats selected for illustrative purposes. For this purpose, the dilatometric method as described by Fulton and associates (JAOCS 31:98, 1954) has been employed. As the solids in a given fat melt, there is an increase in volume. Calculations based upon the volume occupied by a given weight of fat at specific test temperatures in relation to the volume occupied by the same weight of the fat in the completely melted state provide the so-called solids content index (SCI) of the fat at these test temperatures.

This SCI test is widely used today as a convenient, reproducible, albeit arbitrary measure of the solids in a fat at different temperatures. Thus, fats containing less solids at 50° F. are more spreadable or workable in the cold. Fats containing more solids at elevated temperatures (viz., at 92° F.) are firmer and less likely to show oil separation. In the case of margarine fats, it is desirable that the SCI figures at 92° F. be low since such fats must melt readily in the mouth (body temperature=98.6° F.). Shortenings have much higher SCI values at 92° F. since they are neither eaten as such nor are they marketed or stored in the refrigerator.

TABLE 4

*Further characterization of present day margarine and shortening fats*

| Fat | Analytical Constants | | Solids Content Index at— | | | |
|---|---|---|---|---|---|---|
| | M.P., °F. | Iodine No. | 50° F. | 70° F. | 80° F. | 92° F. |
| Margarine—B | 96.0 | 73.0 | 34.9 | 20.0 | 14.5 | 3.7 |
| Margarine—C | 96.0 | 80.0 | 26.0 | 15.0 | 10.4 | 3.8 |
| Shortening—A | 114.3 | 69.5 | 26.5 | 18.2 | 17.1 | 11.7 |
| Shortening—B | 106.9 | 67.2 | 40.2 | 27.8 | 24.5 | 14.2 |
| Shortening—C | 115.3 | 75.5 | 26.4 | 16.8 | 15.4 | 11.5 |
| Shortening—D | 109.0 | 59.4 | 43.0 | 33.0 | 28.0 | 18.0 |
| Shortening—E | 103.3 | 60.6 | 49.5 | 33.7 | 29.0 | 16.2 |

An object of this invention is to provide a novel margarine of high nutritional value, i.e. one containing a fat of high essential fatty acid content and still retaining the functional qualities of conventional solid fats in margarine.

Another object of this invention is to provide a novel margarine containing a fat of high essential acid content and relatively low trans fatty acid content and still retaining the functional qualities of conventional solid fats in margarine.

A further object of this invention is to provide a method for preparing a margarine containing a fat of high essential fatty acid content and still retaining the functional qualities of conventional solid fats in margarine.

Other objects and advantages of this invention will become apparent from the following description and explanation thereof.

In accordance with the present invention, it is contemplated providing a margarine the fat of which contains about 15 to 60% essential fatty acid, not more than about 10% trans oleic acid, a solids content index at 50° F. of about 1.5 to 8 times the solids content index at 92° F. and having the fatty acid radicals of the glycerides in random distribution. The fat of the present invention has a solids content index of at least 4 at 70° F.

As previously indicated, fats containing high quantities of essential acids are most desirable because of their nutritional value. The limpid vegetable oils of domestic origin (see Table 1) contain in their naturally occurring state large quantities of essential fatty acids and are almost free of trans fatty acids. The trans fatty acids are produced during hydrogenation. The glycerides making up the limpid vegetable oils contain the fatty acid radicals in what is termed "even distribution." Even distribution of a given fatty acid in a fat or oil means that the fatty acid has as wide a distribution in the triglyceride molecules as possible, viz. no appreciable quantities of triglycerides of this fatty acid are found until 60% or more of the total fatty acid content (expressed on the molar basis) is this fatty acid. The original pattern of even distribution of fatty acid radicals is not disturbed by subjecting the oil or fat to partial hydrogenation, whether it be under selective or non-selective conditions. It is only through the mechanism of the present invention that the pattern of distribution of fatty acid radicals in the glyceride molecules of the oil or fat is changed to that of random distribution; i.e. one in which the fatty acids combine with the glycerol in accordance with chance. Random distribution follows the probability curve. Whether an oil has random or even distribution of fatty acid radicals can be ascertained by subjecting the oil to an inter-esterification treatment or ester interchange and then checking for changes in the physical properties, viz. in the solids content index, of the inter-esterified product with those of the oil before inter-esterification. If the fatty acids in a fat are already combined with the glycerol according to the pattern of random distribution, there will be no change in the solids content indices over a temperature range of 50° to 92° F. as a result of inter-esterification. If the oil or fat has even distribution of fatty acid radicals, the solids content index will be changed by inter-esterification. Thus, in using the expression "fat having the fatty acid radicals in random distribution" we means fats which have undergone an inter-esterification process.

Important changes are effected by inter-esterification in accordance with the method of the present invention. A limpid or lightly hydrogenated oil can be blended or mixed with a completely or more highly hydrogenated fat and inter-esterified to rearrange the fatty acid radicals so as to impart to the blend as a whole, firmness characteristic of margarine fats or shortening fats. Furthermore, the inter-esterification reaction, which effects random distribution, causes a desirable change in the solids content index such that the product will have desirable mouthing qualities and firmness at room and lower temperatures which is expected and needed in the case of margarine or shortening fat. In general, the inter-esterified product has a solids content index at 50° F. of from 1.5 to 8 times that at 92° F., and more particularly, the solids content index for the margarine fat at 50° F. varies from 2 to 8 times that at 92° F., and for the shortening fat about 1.5 to 4 times that at 92° F. In certain baking operations the margarine fats of this invention may be used as shortenings and vice versa.

The blend to be subjected to inter-esterification comprises on the one hand a limpid vegetable oil of iodine value of 85 to 155 and containing about 20 to 75% essential fatty acid, e.g. oils derived from peanut, sesame, cottonseed, corn, sunflower, soybean, safflower or lightly hydrogenated oils, and on the other hand a hydrogenated fraction of fat free of linoleic acid radicals and containing not more than about 40% trans fatty acid radicals. The lightly hydrogenated oil is characterized by still containing about 20 to 50% of linoleic acid. For the purpose of the invention it is preferred to use as the firm component of the blend a hydrogenated fat which is completely hydrogenated so as to be essentially free of trans fatty acids. When using a completely hydrogenated fat, less is required in preparing the blend for the inter-esterification treatment. For example, the blend to be used in making a margarine fat may contain about 10 to 30% by weight of completely hydrogenated fat, and in the case of shortening, a completely hydrogenated fat may comprise about 15 to 40% by weight of the total blend. On the other hand, an incompletely hydrogenated fat will be used in larger quantities for margarine fat production, e.g. about 20 to 40% by weight of the blend. The heavily hydrogenated fat can be derived from the hydrogenation of vegetable oils or from animal fat. This fat is characterized by having a high saturated fatty acid content (principally stearic acid) which is then redistributed in a random pattern in the finished product of this invention. In general, the hydrogenated fat has a melting point of about 125 to about 165° F., and an iodine number of about 0 to about 40.

In the selection of the components of the blend described hereinabove, the important consideration is that the final product after inter-esterification contains essential fatty acids in required amounts and trans fatty acids in minimal amounts. The character of the individual radicals making up the glyceride is not changed by the interesterification reaction, and in so far as nutritional value is concerned, it makes no difference whether one glyceride molecule contains three essential fatty acid radicals or whether each of three glyceride molecules contain one essential fatty acid radical. The positioning of the essential fatty acid radicals in the glyceride molecule, however, becomes important in respect to the physical characteristics of the fat for human consumption. These new margarines and shortenings are stored and used as solid fats at certain temperatures and materials designed to replace conventional margarine and shortening fats should have prescribed solids content indices in order to obtain consumer acceptance. For the purpose of this invention the product of inter-esterification is the fat having a solids content index at 70° F. of at least about 4 and up to about 20. The margarine fat has a solids content index of about 4 to about 15 at 70° F., whereas the shortening fat has a solids content index of about 10 to 20 at 70° F.

The blend of oil and fat to be inter-esterified contains in general about 15 to 60% by weight essential fatty acids in non-randomized distribution, more usually about 20 to 45%, and preferably about 25 to 40% by weight. The trans fatty acid content of the blend runs not more than about 10%, and more usually not more than 6%, and preferably not more than about 4%. Since it is the purpose of this invention to simulate naturally occurring materials in respect to content of the essential fatty acids and trans fatty acids, the quantity of the former is controlled to approximate what is found in limpid unhydrogenated domestic vegetable oils while the quantity of the latter (the trans acids) is held to the upper limit of that found in butter derived from milk, i.e. a material containing at most about 10% trans fatty acids. It is desired to blend an oil and fat in proportions to produce an end-product having satisfactory physical characteristics and at the same time having the highest essential fatty acid content possible. The variation in the essential fatty acid content mentioned above it due to the fact that limpid oils will vary in their essential fatty acid content. It should be understood for the purpose of this specification and the appended claims that limpid oil is intended to include a lightly hydrogenated vegetable oil. The variation in essential fatty acid content can be illustrated by reference to peanut oil as being typical of a domestic vegetable oil, relatively low in essential fatty acid content oil, and safflower as being typical of an oil high in essential fatty acid content. When the limpid oil contains about 50 to 60% essential fatty acid, and this involves, for example, oils from cottonseed, corn, sunflower, soybean, etc., the finished product can contain about 25 to 45% of essential fatty acids and a trans fatty acid content not exceeding about 4% by weight.

The inter-esterification reaction is conducted at a temperature less than about 550° F. and more usually it is less than about 200° F. in order to prevent isomerization of fatty acids (trans fatty acids) from occurring. It is preferred that the inter-esterification reaction be conducted at a temperature of about 150 to 200° F. The reaction is carried out until equilibrium is reached and this may require from about 20 minutes to an hour. It is preferred that air be excluded from the reaction and this is accomplished by operating the process under reduced pressure or by maintaining an atmosphere of inert gas, e.g. nitrogen or hydrogen, in the reaction vessel. The reaction is carried out in the presence of a catalyst which can be any one of the well-known varieties. For this purpose, the catalyst includes sodium or potassium alkoxides, e.g. sodium methoxide, potassium propoxide, etc.; sodamide; sodium-potassium alloy; anhydrous acid catalysts, e.g. hyrogen chloride, sulfuric acid, phosphoric acid, etc. The catalyst can be of the alkaline or acidic type for the ester interchange reaction but in the case of the acidic catalysts, reaction times are very much longer than in the case of the alkaline catalysts. About 0.05% to 1% by weight of catalyst based on the oil and fat blend is employed for the inter-esterification reaction. The quantity of catalyst will depend to a large extent on the amount needed to neutralize any free fatty acid in the blend in the case of an alkaline catalyst or to react with any moisture present therein. A guide for determining the amount of catalyst to be used is to measure the amount destroyed by the above two side reactions and then employ about 0.1% in excess thereof. At the end of the reaction the catalyst is removed by water washing with or without neutralization. After drying, the fat product may be bleached, prior to deodorization by well known techniques and finally deodorized. An alternative method for the inter-esterification reaction is disclosed in the Gooding patent, U.S. 2,309,949, and that disclosure is incorporated herein by reference.

In the event that the inter-esterified product contains more saturated fatty acids and be firmer than is desired, the quantity can be adjusted by blending with it a limpid oil of high essential fatty acid content to yield products of about 25 to 60% in essential fatty acid content. On the other hand, should the inter-esterified product be too soft for the intended purpose, the product can be hardened or made to have a higher melting point by hydrogenation or by blending with a firmer fat to yield products of about 15 to 50% in essential fatty acid content. While hydrogenation or blending with a firm but partially hydrogenated fat tends to increase the trans fatty acid content and reduce the essential fatty acid content, these measures can be controlled to obtain a finished product of the desired specifications.

Since the fats of the present invention contain extraordinarily high essential fatty acid contents, it is desirable to employ antioxidants for the purpose of stabilizing the same against deterioriation through oxidation. For this purpose, various antioxidants can be used, including the phenolic type, such as, for example, tocopherols, butylated hydroxyanisole, butylated hydroxytoluene, propyl gallate, etc. Similarly, acid synergists can be used, such as for example, citric acid, isopropyl citrate, lecithin, ethylene diamine tetra-acetic acid, etc. The antioxidants and/or acid synergists are added in an amount not exceeding about 0.1% by weight based on the fat when added to protect the fat against oxidative deterioration. The antioxidants serve another useful function in addition to stabilizing the fat. With the greater human consumption of essential fatty acids there is greater need for vitamin E. Vitamin E is an antioxidant which is absorbed from the gastro-intestinal tract and functions in vivo. The limpid oils which are used in the present invention are rich in natural tocopherols, including alpha-tocopherol. The latter is by far the most effective in vitamin E activity. By incorporating additional quantities of antioxidants in the fats of this invention the ingested alpha-tocopherol is better protected until absorbed from the gastro-intestinal tract and, thus, more is available in vivo as the regulator of the oxidation and metabolism of the essential fatty acids. Therefore, the present invention can also provide a means of supplementing the diet with extra antioxidants in an amount up to about 1% based on the margarine.

The inter-esterified product is used as the fat constituent of margarine or as a shortening fat. Presently a margarine is defined by the Food and Drug Administration of the United States Government as a product containing not less than 80% fat and roughly 20% skim milk with or without salt (sodium chloride). The fat of the present invention used in margarine provides a food of substantially greater nutritional value than butter or margarines of the prior art. As previously noted, butter is very low in essential fatty acid content, and conventional margarines currently being produced are only somewhat better in this respect. Similarly, the fat of the present invention, as a shortening, will possess higher nutritional value than any shortening previously known in the food industry and of comparable solids content index.

In order to provide a fuller understanding of the present invention, reference will be had to specific examples, and it should be understod that no undue restrictions or limitations should be implied as to the scope of the invention by reason thereof. The following examples are offered as being typical of the inter-esterification procedure and the product to be obtained therefrom. The procedures for the ester interchanges followed either No. 1 or No. 2 described below.

PROCEDURE NO. 1

This method was used in making Examples 1, 3–15. The details as employed in Example No. 10 are herewith given. 375 g. of refined limpid soybean oil and 125 g. of completely hydrogenated cottonseed fat were blended and heated while stirring in a stream of nitrogen gas to a temperature of 250° F. in order to eliminate any moisture present. After cooling to 180° F., 1.5 g. of commercial sodium methoxide were added and stirring was continued in an atmosphere of nitrogen for 45 minutes at a temperature between 170° F. and 195° F. At the end of this period 3½ g. of citric acid in 100 ml. of water were added with stirring continued for about 5 minutes in order to decompose the catalyst and to acidify any soaps formed. The product was then washed 4 times with a large volume of warm water, dried by evaporation under reduced pressure, bleached with 2% bleaching earth and 1% bleaching carbon, filtered and finally deodorized. The product was found to have a melting point of 102.4° F. and its iodine value was 99.6. Its combined linoleic and linolenic acid content was 44.6% and trans fatty acid content was 2.0%.

PROCEDURE NO. 2

This method was used in making Example 2 and the basic inter-esterified fat component of Examples 16–21. 7350 lb. of completely hydrogenated cottonseed fat and 34,650 lb. of refined and bleached limpid cottonseed oil were mixed and heated under reduced pressure to 190° F. in order to completely dry the fat mixture and reaction kettle. 75 lb. of powdered sodium methoxide was introduced through a suction tube and stirring continued for one hour. Soon after introduction of the catalyst, a red-brown color developed in the reaction mixture which persisted until after the reaction period when the contents of the reaction vessel were allowed to come to atmospheric pressure and water-washing was begun. Removal of catalyst and refining of the reaction mixture were simultaneously accomplished by introducing a spray of warm water over the surface of the quiescent reaction mixture. Washing was continued while withdrawing the sedimented wash water from the bottom of the kettle until the wash water was essentially free of alkali. After this refining operation, the purified reaction mixture was passed through a continuous vacuum drier into a bleaching kettle where it was bleached under reduced pressure by agitation with 1½% bleaching clay. The bleaching clay was removed by filtration and the product was deodorized in the conventional manner. It was found to have a melting point of 100.8° F. and an iodine value of 90.6. Its linoleic acid content was 40.7% and trans fatty acid content was 1.9%.

In order to demonstrate the difference between the fat obtained by the method of the present invention and that obtained by blending a high melting fat with an oil of low melting point, a comparison is presented in Table 5 below. The blend of high melting fat and a limpid unhydrogenated oil is known as a compound-shortening. Such products are rich in essential fatty acids and have an exceedingly wide plastic range, that is, they are spreadable at cold temperatures and resistant to oiling off at elevated temperatures.

ings, it is apparent that the compound blends exhibit a greater range of plasticity. However, none of the blends in Table 5, i.e. blends A–E inclusive, is satisfactory for the manufacture of margarine because the SCI values at 92° F. are too high and interfere markedly with mouthing qualities. These blends appear salve-like in the mouth and fail to melt readily to a free oil. In contrast to blends A–E, Examples 1–3 of Table 5 represent margarine fats produced in accordance with the present invention. It will be noted that the SCI values for Examples 1–3 decrease from 50° F. to 92° F. in a manner showing that these fats are excellent for use in margarine formulations. The low SCI values of 50° F. indicate that these margarine fats are more spreadable at cold temperatures than conventional margarines. This is illustrated by a comparison of examples in Table 5 with the margarine fats in Table 4. It is apparent that by means of ester interchange or inter-esterification it is possible to produce fats which are softer at low temperatures than

TABLE 5

*Cottonseed oil blends before and after ester interchange*

| Identity | Unhydrogenated Oil, percent | Completely Hydrogenated Fat, percent | Analytical Constants | | Solids Content Index at— | | | |
|---|---|---|---|---|---|---|---|---|
| | | | M.P., °F. | Iodine No. | 50° F. | 70° F. | 80° F. | 92° F. |
| Components | 100 | | | 110.4 | 0.0 | 0.0 | 0.0 | 0.0 |
| | | 100 | 140 | 1.0 | 100.0 | 100.0 | 100.0 | 100.0 |
| Blend A | 85 | 15 | 122.4 | 94.5 | 17.0 | 17.3 | 16.7 | 17.0 |
| Example 1 [1] | Blend A after ester interchange | | 96.8 | 93.6 | 12.8 | 7.3 | 5.7 | 3.9 |
| Blend B | 82.5 | 17.5 | 124.2 | 90.6 | 19.5 | 19.7 | 19.2 | 19.5 |
| Example 2 [2] | Blend B after ester interchange | | 100.8 | 90.6 | 16.5 | 10.1 | 8.2 | 6.0 |
| Blend C | 80 | 20 | 125.6 | 88.7 | 21.8 | 22.3 | 22.0 | 22.4 |
| Example 3 [1] | Blend C after ester interchange | | 102.9 | 88.3 | 18.3 | 11.9 | 9.6 | 7.2 |
| Blend D | 75 | 25 | 127.4 | 83.8 | 26.0 | 26.0 | 25.9 | 26.8 |
| Example 4 [1] | Blend D after ester interchange | | 106.9 | 82.8 | 21.5 | 13.2 | 10.7 | 9.0 |
| Blend E | 70 | 30 | 128.2 | 77.4 | 31.2 | 31.3 | 31.0 | 31.4 |
| Example 5 [1] | Blend E after ester interchange | | 109.4 | 77.0 | 24.3 | 16.4 | 14.5 | 12.5 |

[1] Blends inter-esterified by Procedure No. 1.
[2] Blend inter-esterified by Procedure No. 2.

Blends A–E, inclusive, in Table 5 above are characteristic of compound shortenings. It is noted that these blends have a plateau in SCI (solids content index) from 50° F. to 92° F. By comparison with the values of those fats shown in Table 4 for conventional shortenings, conventional margarine fats and yet are equivalent or almost equivalent in mouthing qualities, not to mention the substantially enhanced nutritional value.

In Table 6 below additional examples of inter-esterified or ester interchanged products are given.

TABLE 6

*Other oil blends before and after ester interchange*

| Identity of Oil or Fat | Unhydrogenated Oil, percent | Hydrogenated Fat, percent | Analytical Constants | | Solids Content Index at— | | | |
|---|---|---|---|---|---|---|---|---|
| | | | M.P., °F. | Iodine No. | 50° F. | 70° F. | 80° F. | 92° F. |
| Components | Cottonseed (CSO) | | | 110.4 | 0.0 | 0.0 | 0.0 | 0.0 |
| | Peanut (PNO) | | | 97.8 | 0.0 | 0.0 | 0.0 | 0.0 |
| | Corn (CO) | | | 126.0 | 0.0 | 0.0 | 0.0 | 0.0 |
| | Soybean (SBO) | | | 132.2 | 0.0 | 0.0 | 0.0 | 0.0 |
| | | Cottonseed (CSO) | 140 | 1.0 | 100.0 | 100.0 | 100.0 | 100.0 |
| | | Soybean (SBO-1) | 160 | 1.0 | 100.0 | 100.0 | 100.0 | 100.0 |
| | | Peanut (PNO) | 140 | 1.0 | 100.0 | 100.0 | 100.0 | 100.0 |
| | | Soybean (SBO-2) | 139 | 30.5 | 88.7 | 85.2 | 82.5 | 79.4 |
| Blend F | 85 (PNO) | 15 (CSO) | 122.9 | 79.3 | 14.9 | 15.3 | 15.1 | 15.0 |
| Example 6 [1] | Blend F after ester interchange | | 94.3 | 78.8 | 10.1 | 4.1 | 2.2 | 1.3 |
| Blend G | 75 (PNO) | 25 (CSO) | 130.1 | 73.7 | 25.1 | 25.2 | 25.1 | 25.2 |
| Example 7 [1] | Blend G after ester interchange | | 101.2 | 73.2 | 18.2 | 9.3 | 6.5 | 5.2 |
| Blend H | 80 (CO) | 20 SBO-1 | 135.7 | 99.4 | 20.8 | 21.9 | 22.5 | 23.0 |
| Example 8 [1] | Blend H after ester interchange | | 98.6 | 98.8 | 8.3 | 4.4 | 2.8 | 2.2 |
| Blend I | 75 (CO) | 25 (SBO-1) | 140.1 | 94.8 | 26.2 | 26.3 | 26.2 | 26.4 |
| Example 9 [1] | Blend I after ester interchange | | 100.5 | 94.4 | 16.4 | 7.9 | 5.8 | 4.5 |
| Blend J | 75 (SBO) | 25 (CSO) | 128.5 | 100.0 | 22.9 | 24.7 | 24.4 | 26.2 |
| Example 10 [1] | Blend J after ester interchange | | 102.4 | 99.6 | 13.1 | 7.0 | 5.4 | 4.2 |
| Blend K | 70 (SBO) | 30 (CSO) | 133.4 | 92.9 | 28.0 | 28.1 | 28.2 | 28.4 |
| Example 11 [1] | Blend K after ester interchange | | 103.6 | 92.4 | 19.3 | 10.1 | 7.8 | 6.0 |
| Blend L | 42.5(CSO)+40(CO) | 7.5 (SBO-1)+10(PNO) | 131.0 | 97.0 | 19.7 | 19.9 | 19.9 | 20.1 |
| Example 12 [1] | Blend L after ester interchange | | 99.7 | 96.4 | 11.6 | 6.1 | 4.3 | 3.0 |
| Blend M | 37.5(CSO)+35(CO) | 12.5(SBO-1)+15((PNO) | 135.0 | 86.4 | 29.2 | 29.3 | 29.4 | 29.2 |
| Example 13 [1] | Blend M after ester interchange | | 101.0 | 86.0 | 19.7 | 10.0 | 7.7 | 5.8 |
| Blend N | 70 (PNO) | 30 (SBO-2) | 130.6 | 73.1 | 29.2 | 29.3 | 29.3 | 29.2 |
| Example 14 [1] | Blend N after ester interchange | | 101.6 | 72.9 | 19.0 | 10.1 | 7.1 | 5.0 |
| Blend O | 70 (PNO) | 30 (PNO) | 133.2 | 67.4 | 33.0 | 33.3 | 33.4 | 33.7 |
| Example 15 [1] | Blend O after ester interchange | | 113.4 | 66.9 | 27.7 | 14.6 | 12.8 | 11.6 |

[1] Blends inter-esterified by Procedure No. 1.

In Table 6 are shown results obtained when other limpid oils are used in place of the unhydrogenated cottonseed oil and when other more or less completely hydrogenated fats are employed in place of the completely hydrogenated cottonseed oil. Thus, Examples 6–11 show additional novel margarine fats of the present invention. Examples 12 and 13 are illustrative of novel margarine fats obtained by ester interchange of a blend comprising two or more limpid oils and two or more completely hydrogenated fats.

In the less preferred fats of the present invention the trans fatty acid content may be allowed to attain that concentration which is found in some of the naturally occurring fats, viz., 5–9% in butter (see Table 2). A heavily but incompletely hydrogenated vegetable oil, but one still substantially free of essential fatty acid, may then be used as the firming-up agent but of necessity in greater ratio than would be used otherwise; compare Example 14 with Example 7. It also follows that essential fatty acid activity is less in the case of products made with the incompletely hydrogenated fats as the firming-up agent, varying from about 15 to 30%, but yet very much greater than the essential fatty acid content of conventional margarines (compare value in Table 7 for Example 14 with those in Table 2 for conventional margarine oils). Because of the trans fatty acid content of the incompletely hydrogenated vegetable oil component of the starting blend, the temperature of interesterification is preferably in the low effective range, viz. 150–200° F. In this way further trans fatty acid production is prevented.

Example 15 is illustrative of an additional shortening fat made through the ester interchange reaction between limpid vegetable oil and completely hydrogenated vegetable oil other than cottonseed oil. Obviously, in attaining the objects of the present invention, a margarine or shortening fat high in essential fatty acid activity and very low in trans fatty acid content, any limpid or lightly hydrogenated domestic vegetable oil rich in the essential fatty acids, viz. above about 20%, may be employed as the base oil. Any heavily or completely hydrogenated fat may be used as the firming-up agent, including those of animal origin. The more nearly completely hydrogenated are these fats, the less is the possibility of trans fatty acids being introduced into the final fat. Thus, we use, to equal advantage, completely hydrogenated tallow or completely hydrogenated lard in place of the completely hydrogenated vegetable oils described. When the animal fats are completely hydrogenated, or nearly so, they lose their identities and become interchangeable with the completely hydrogenated (or nearly completely hydrogenated) vegetable oils.

In Table 7 below are listed the compositions of the examples described in Tables 5 and 6.

In Table 7, the linoleic (and linolenic) acid content of the new fats after ester interchange equals that of the original unhydrogenated vegetable oil multiplied by its percentage in the blend prior to the ester interchange. The linoleic (and linolenic) acid being unmodified (i.e. still having the natural cis configurations), exhibit full essential fatty acid activity. The trans fatty acid concentrations in the preferred fats of the present invention are no greater than those in the original unhydrogenated vegetable oils themselves, probably zero in magnitude for every example other than Example 14 after correcting for irrelevant infra-red absorption (as mentioned earlier). Only in the case of Example 14 are the trans fatty acids present in significant concentration, but in this case, illustrative of the less preferred fats of the present invention, the trans acids are no greater than that found in butter fat, average of about 7%, range 5–9%. It will be observed from Tables 5 and 6 that the novel shortening fats of this invention differ from the novel margarine fats principally in having a smaller ratio of solids at 50° F. to solids at 92° F. In general, the shortenings have a solids content index at 50° F. of from 1.5 to 4 times that at 92° F., whereas the margarine fats have a solids content index at 50° F. of from 2 to 8 times that at 92° F. This difference is due to the fact that a greater concentration of completely hydrogenated fat is used in the preparation of shortening than in the case of margarine fat with the result that the solids content index increases percentagewise more rapidly at 92° F. than at 50° F.

Plant production runs have been made using the novel fats of the present invention. For illustrative purposes

TABLE 7

*Fatty acid composition of the examples listed in Tables 5 and 6*

| Identity of Oil or Fat | Iodine No. | Fatty Acid Composition | | | | Characterization of Unsaturates | |
|---|---|---|---|---|---|---|---|
| | | Saturated, percent | Oleic, percent | Linoleic, percent | Linolenic, percent | Essential, percent | Trans, percent |
| Unhydrogenated cottonseed oil | 110.4 | 22.7 | 23.6 | 49.3 | 0.0 | 49.3 | 2.3 |
| Unhydrogenated peanut oil | 97.8 | 12.5 | 57.9 | 25.3 | 0.0 | 25.3 | 1.8 |
| Unhydrogenated corn oil | 126.0 | 10.4 | 31.0 | 54.2 | 0.0 | 54.2 | 2.5 |
| Unhydrogenated soybean oil | 132.2 | 12.4 | 23.8 | 52.6 | 6.8 | 59.4 | 2.6 |
| Hydrogenated cottonseed fat | 1.0 | 94.5 | 1.1 | 0.0 | 0.0 | 0.0 | 0.0 |
| Hydrogenated soybean fat—1 | 1.0 | 94.5 | 1.1 | 0.0 | 0.0 | 0.0 | 0.0 |
| Hydrogenated peanut fat | 1.0 | 94.5 | 1.1 | 0.0 | 0.0 | 0.0 | 0.0 |
| Hydrogenated soybean fat—2 | 30.5 | 61.7 | 33.9 | 0.0 | 0.0 | 0.0 | 23.8 |
| Example: | | | | | | | |
| 1 (Margarine) | 93.6 | 33.8 | 20.0 | 41.8 | 0.0 | 41.8 | 2.0 |
| 2 (Margarine) | 90.6 | 36.0 | 18.9 | 40.7 | 0.0 | 40.7 | 1.9 |
| 3 (Margarine) | 88.3 | 37.4 | 18.8 | 39.4 | 0.0 | 39.4 | 1.8 |
| Example: | | | | | | | |
| 4 (Shortening) | 82.8 | 40.1 | 19.3 | 36.2 | 0.0 | 36.2 | 1.7 |
| 5 (Shortening) | 77.0 | 44.9 | 16.2 | 34.5 | 0.0 | 34.5 | 1.6 |
| Example: | | | | | | | |
| 6 (Margarine) | 78.8 | 29.8 | 44.3 | 21.5 | 0.0 | 21.5 | 1.6 |
| 7 (Margarine) | 73.2 | 33.4 | 43.2 | 19.0 | 0.0 | 19.0 | 1.5 |
| Example: | | | | | | | |
| 8 (Margarine) | 98.8 | 29.6 | 22.6 | 43.4 | 0.0 | 43.4 | 2.0 |
| 9 (Margarine) | 94.4 | 31.7 | 23.2 | 40.7 | 0.0 | 40.7 | 1.9 |
| Example: | | | | | | | |
| 10 (Margarine) | 99.6 | 35.2 | 15.8 | 39.5 | 5.1 | 44.6 | 2.0 |
| 11 (Margarine) | 92.4 | 39.8 | 14.2 | 36.8 | 4.8 | 41.6 | 1.9 |
| Example: | | | | | | | |
| 12 (Margarine) | 96.4 | 31.6 | 21.4 | 42.6 | 0.0 | 42.6 | 2.0 |
| 13 (Margarine) | 86.0 | 37.8 | 20.3 | 37.5 | 0.0 | 37.5 | 1.7 |
| Example 14 (Margarine) | 72.9 | 32.4 | 45.5 | 17.7 | 0.0 | 17.7 | 8.5 |
| Example 15 (Shortening) | 66.9 | 39.0 | 38.9 | 17.7 | 0.0 | 17.7 | 1.3 | the experiences with our novel margarine fat of Example 2 are presented. From past experiences we have been led to believe—and this is generally accepted by those skilled in the art—that a margarine fat containing less solids than that represented by a solids content index (SCI) figure of 20 at 50° F. and 12 at 70° F. will not pack properly. The resulting chilled set-up margarine emulsion when forced into the mold by the screw-drive of the packaging machine (Morpac) is too soft so that in subsequent handling during wrapping and cartoning, "crippling" of the prints occurs. Under such circumstances it has been necessary to pre-chill such margarine overnight in the refrigerator at about 45° F. before packaging. Therefore, it was anticipated that margarine made with the margarine fats of the present invention, characterized by very low SCI values at both 50° and 70° F., would be impossible to package in an uninterrupted run. We had expected to store the chilled margarine emulsions at temperatures even as low as 25° F. prior to packaging if holding overnight at 45° F. still gave too soft a product.

In the manufacture of the margarine using the conventional Votator assembly (Bailey, A.E., 1951, Industrial Oil and Fats, Interscience Publishers, Inc., New York, 2nd ed., pp. 921-3) involving a chilling A-unit and a quiescent B-unit, it has been found that the chilled extruded margarine emulsion is truly very soft, so soft that the extruded "noodles" run together to form a continuous mass. However, within about ten minutes after the chilled margarine emulsion made with Example 2 is extruded, it surprisingly sets up into a very firm product, actually firmer than that made with the conventional margarine fats. This firm plasticized product lends itself to almost immediate packaging, i.e., within about ten minutes following its ejection from the quiescent B-unit. When such margarine is packaged and stored overnight in the refrigerator, it remains exceedingly firm, the firmness being in sharp contrast to that predicted from the SCI figure for the fat at 50° F. However, when the margarine is allowed to temper at room temperature, a profound change in body characteristics occurs, far more surprising than anything seen with conventional margarines. The chilled packaged margarine softens markedly at the surface, with the center core or the pieces beneath the surface remaining exceedingly firm. Eventually the product becomes soft and uniform to the touch, the body at room temperature now checking with that predictable from the SCI values. At this point, the tempered margarine is returned to the refrigerator. It now has a soft uniform plastic body in the cold, in agreement with SCI predictions. On standing at room temperature, the margarine remains uniform in body, and softens in the same way as does conventional margarine on being held at elevated room temperature.

In other words, the new margarine fat surprisingly provides a chilled plasticized margarine emulsion which is sufficiently firm shortly after extrusion from the quiescent B-unit of the Votator assembly to permit packaging in the conventional screw-drive packaging (Morpac) machine. Once it is packaged, the product is then conveniently held overnight at room temperature (about 75-75° F.) to permit tempering in the package.

The new margarines may also be molded as a flowable or pumpable gel following passage of the emulsion through the chilling A-unit and then through the working B-unit of the Votator assembly. This molded product sets up exceedingly firm in a matter of about ten minutes. Only after tempering overnight at room temperature (65-75° F.) is this molded product regarded as satisfactory as a bread spread, having then the properties predicted from the SCI values.

In Table 8 is a comparison of temperature conditions in the manufacture of margarine made with a novel fat of the present invention (Example 2) and in the manufacture of conventional margarine. Of particular importance, as shown in Table 8, are the dramatic effects of tempering on the body of the novel margarines of the present invention. Shortenings made with the novel fats of the present invention are likewise tempered in their container after plasticizing; tempering for 15-48 hours is preferably carried out at a temperature of about 75° F.-85° F.

TABLE 8

*Firmness of margarines in the refrigerator before and after tempering*

| Margarine | Processing | Temperature, °F. | Penetrations on Prints at 45° F.[2] | |
|---|---|---|---|---|
| | | | Untempered, mm.×10 | Tempered, mm.×10 |
| Conventional | (a) Chilling A-unit [1] | 49 | | |
| | (b) Quiescent B-unit | 58 | | |
| | (c) Screw drive of chilled product into mold. | 62 | 180 | 200 |
| Example 2 | (a) Chilling A-unit [1] | 46 | | |
| | (b) Quiescent B-unit | 52 | | |
| | (c) Screw drive of chilled product into mold. | 57 | 165 | 270 |
| Example 2 | (a) Chilling A-unit [1] | 60 | | |
| | (b) Working B-unit [1] | 64 | | |
| | (c) Pumping flowable gel into mold. | 64 | 150 | 250 |

[1] Of the Votator assembly as described by Vogt et al., U.S. Patent No. 1,847,149 and by Bailey supra.
[2] Penetration values obtained on the resulting margarines when a standard needle is dropped on to the product at the temperature indicated. The steel needle of ⅛ inch diameter, 6¼ inches in length, and weighing 8.34 grams is dropped through a glass guide tube from a height of 25 cm.

Another device facilitating the packaging of the margarines of the present invention involves blending our novel margarine oils with hydrogenated and/or unhydrogenated oils. The added oil components should be preferably unhydrogenated or essentially completely hydrogenated oils so that no significant amounts of trans acids will be introduced into the blends. Coconut oil high in solids content at 50° F. and at 70° F. in relation to the solids content at 92° F., before and after the hydrogenation, is a particularly good additive to our new margarine oils. Examples 16-21 described in Table 9 show how the coconut oil additives increase the solids contents of the inter-esterified margarine oil at temperatures where increased solids are desired for packaging purposes, namely at 50° F. and at 70° F. Of interest is the observation that this improvement in body for pack-

TABLE 9

*Blends comprising addition of hydrogenated and unhydrogenated oils to the ester-interchanged fat*

| Identity of Oil or Fat | Base Fat [1] (Exple. 2), percent | Hydrogenated Coconut Fat, percent | Unhydrogenated Coconut Oil, percent | Analytic Constants | | Solids Content Index at— | | | |
|---|---|---|---|---|---|---|---|---|---|
| | | | | M.P., °F. | Iodine No. | 50° F. | 70° F. | 80° F. | 92° F. |
| Components | 100 | 0 | 0 | 104.4 | 89.6 | 16.1 | 9.1 | 7.5 | 5.9 |
| | 0 | 100 | 0 | 101.0 | 1.0 | 65.6 | 43.5 | 13.7 | 4.6 |
| | 0 | 0 | 100 | 75.5 | 9.5 | 56.1 | 26.7 | 0.0 | 0.0 |
| Example: | | | | | | | | | |
| 16 | 95 | 5 | 0 | 103.6 | 85.1 | 19.2 | 9.2 | 8.0 | 3.0 |
| 17 | 90 | 10 | 0 | 103.0 | 80.8 | 22.2 | 9.6 | 8.6 | 3.5 |
| 18 | 85 | 15 | 0 | 102.5 | 76.3 | 25.8 | 10.8 | 8.6 | 4.5 |
| 19 | 80 | 20 | 0 | 102.3 | 71.9 | 28.1 | 12.8 | 8.7 | 5.3 |
| 20 | 75 | 25 | 0 | 102.0 | 67.5 | 31.0 | 14.2 | 8.9 | 5.6 |
| 21 | 75 | 15 | 10 | 102.2 | 68.3 | 26.1 | 9.1 | 8.1 | 4.9 |

[1] Made by Procedure No. 2 from a blend of 82.5% of unhydrogenated cottonseed oil (iodine no. of 112.0, and containing 23.6% saturated fatty acids, 20.1% oleic acid, and 51.9% linoleic acid) and 17.5% of the completely hydrogenated cottonseed fat (iodine no. of 1.0), following ester interchange. This differs from Example 2 of Table 5 only in the use of another lot of unhydrogenated cottonseed oil.

aging purposes is also associated with improvement in mouthing characteristics (decrease in the solids content at 92° F.). The margarine oils of Examples 17 and 18 are the preferred ones in this series; the resulting margarines can be packed immediately without a waiting period following extrusion from the quiescent B-unit of the Votator assembly, and mouthing properties are also improved. These packaged margarines must also be tempered at about 75° F. before regular storage at refrigerated temperatures.

In Table 10 are listed the fatty acid compositions of the blends comprising addition of hydrogenated and unhydrogenated coconut oil to the novel inter-esterified margarine oil. It will be noted that linoleic acid content and hence the essential fatty acid content of these blends are very high, i.e. in the same order of magnitude characterizing the unhydrogenated domestic vegetable oils. Trans fatty acid content remains negligible.

TABLE 10

*Fatty acid composition of the examples listed in Table 9*

| Identity of Oil or Fat | Iodine No. | Fatty Acid Composition | | | Characterization of Unsaturates | |
|---|---|---|---|---|---|---|
| | | Saturated, percent | Oleic, percent | Linoleic, percent | Essential, percent | Trans, percent |
| Base Fat (Example 2) | 89.6 | 39.2 | 13.6 | 42.8 | 42.8 | 1.8 |
| Hydrogenated Coconut Fat | 1.0 | 94.5 | 1.1 | 0.0 | 0.0 | 0.0 |
| Unhydrogenated Coconut Oil | 9.5 | 87.1 | 6.5 | 2.0 | 2.0 | 0.0 |
| Example: | | | | | | |
| 16 (Margarine) | 85.1 | 42.1 | 12.9 | 40.6 | 40.6 | 1.7 |
| 17 (Margarine) | 80.8 | 44.8 | 12.3 | 38.5 | 38.5 | 1.6 |
| 18 (Margarine) | 76.3 | 47.5 | 11.7 | 36.4 | 36.4 | 1.5 |
| 19 (Margarine) | 71.9 | 50.3 | 11.1 | 34.2 | 34.2 | 1.4 |
| 20 (Margarine) | 67.5 | 53.1 | 10.4 | 32.1 | 32.1 | 1.3 |
| Example 21 (Margarine) | 68.3 | 52.3 | 11.0 | 32.3 | 32.3 | 1.3 |

In order to reduce the extent of treatment used to reduce objectionable color intensities of the present fat products, an edible gas may be incorporated therein. By dispersing an edible gas into the warm margarine emulsion containing the fat in the melted state or into the melted shortening fat just prior to chilling and plasticizing, color improvement is effected. Furthermore, by plasticizing with an edible gas finely dispersed in the products, the resultant margarines and shortenings have a better appearance to the eye. For these two reasons, improvement in color quality and a drier appearance, an edible gas is finely dispersed in concentrations up to 15% by volume in the product just prior to chilling. Air and preferably an inert gas such as nitrogen or carbon dioxide are used for this purpose. The quantity of gas to be included in the present fat may be greater than 15%, for example, the gas concentration may range from about 15 to 40%, based on the total volume of the whipped margarine. The type of gas and the method by which the margarine and shortenings are whipped can follow the procedure given in the Melnick application, Serial No. 658,011, filed May 9, 1957, and the disclosure in that application is hereby incorporated by reference.

Having thus provided a written description of the present invention and provided specific examples thereof, it should be understood that no undue restrictions or limitations are to be imposed by reason thereof but that the present invention is defined by the appended claims.

We claim:

1. A margarine comprising about 20% milk phase and about 80% of a glyceridic fat containing about 15 to 60% of an essential fatty acid, not more than about 10% trans fatty acid, an SCI at 70° F. of about 4 to 15, an SCI at 50° F. of about 2 to 8 times that at 92° F., and having the fatty acid radicals in random distribution.

2. The margarine of claim 1 wherein the essential fatty acid comprises about 20 to 45% and the trans fatty acid is not more than about 4%.

3. A margarine comprising about 20% milk phase and about 80% of a glyceridic vegetable fat containing about 25 to 40% of an essential fatty acid, not more than about 4% trans fatty acid, an SCI at 70° F. of about 4 to 15, an SCI at 50° F. of about 2 to 8 times that at 92° F. and having the fatty acid radicals in random distribution.

4. A margarine comprising a milk phase and not less than 80% of a glyceridic fat containing about 15 to 60% of an essential fatty acid, not more than about 10% trans fatty acid, an SCI at 70° F. of about 4 to 15, an SCI at 50° F. of about 2 to 8 times that at 92° F., and having the fatty acid radicals in random distribution.

5. A margarine comprising a milk phase and not less than 80% of a blend of glyceridic fats wherein the major component is a fat having the fatty acid radicals in random distribution and the minor component is a limpid unhydrogenated vegetable oil, said fat blend containing about 25 to 60% of an essential fatty acid, not more than about 10% trans fatty acid, an SCI at 70° F. of about 4 to 15, and an SCI at 50° F. of about 2 to 8 times that at 92° F.

6. A margarine comprising a milk phase and not less than 80% of a blend of glyceridic fats wherein the major component is a fat having the fatty acid radicals in random distribution and the minor component is a hydrogenated fat, said fat blend containing about 15 to 50% of an essential fatty acid, not more than about 10% trans fatty acid, an SCI at 70° F. of about 4 to 15 and an SCI at 50° F. of about 2 to 8 times that at 92° F.

References Cited in the file of this patent

UNITED STATES PATENTS

| | | |
|---|---|---|
| 2,174,365 | Gudheim | Sept. 26, 1939 |
| 2,304,452 | Gudheim | Dec. 8, 1942 |
| 2,430,596 | Ziels | Nov. 11, 1947 |
| 2,511,428 | Buxton et al. | June 13, 1950 |
| 2,511,802 | Hall | June 13, 1950 |

OTHER REFERENCES

Bailey: Industrial Oil and Fat Products, 2nd ed. (1951), Interscience Publishers Inc., New York, pp. 826, 827, 830–832, 242, 243 and 301.

Schwitzer: Margarine and Other Food Fats (1956), Interscience Publishers Inc., New York, pp. 284 and 288.

UNITED STATES PATENT OFFICE
CERTIFICATE OF CORRECTION

Patent No. 2,921,855                               January 19, 1960

Daniel Melnick et al.

It is hereby certified that error appears in the printed specification of the above numbered patent requiring correction and that the said Letters Patent should read as corrected below.

Column 5, line 35, for "means" read -- mean --; column 6, line 37, before "20" insert-- about --; line 43, before "6%" insert -- about --; column 8, line 25, for "understod" read -- understood --; column 8, line 13, for "75-75° F." read -- 70-75° F. --.

Signed and sealed this 21st day of June 1960.

(SEAL)
Attest:

KARL H. AXLINE
Attesting Officer

ROBERT C. WATSON
Commissioner of Patents